US007480403B2

(12) United States Patent
Kruppa et al.

(10) Patent No.: US 7,480,403 B2
(45) Date of Patent: Jan. 20, 2009

(54) APPARATUS, SYSTEM, AND METHOD FOR FRAUD DETECTION USING MULTIPLE SCAN TECHNOLOGIES

(75) Inventors: Robert William Kruppa, Bluffton, SC (US); Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/989,768

(22) Filed: Nov. 16, 2004

(65) Prior Publication Data

US 2006/0104498 A1 May 18, 2006

(51) Int. Cl.
*G06K 9/00* (2006.01)
(52) U.S. Cl. .................................................. 382/140
(58) Field of Classification Search ................ 382/139, 382/140
See application file for complete search history.

(56) References Cited

U.S. PATENT DOCUMENTS

| | | | | |
|---|---|---|---|---|
| 3,764,978 | A * | 10/1973 | Tyburski et al. | 382/318 |
| 4,315,246 | A | 2/1982 | Milford | 340/146.3 D |
| 4,876,735 | A | 10/1989 | Martin et al. | 382/57 |
| 5,371,798 | A * | 12/1994 | McWhortor | 380/51 |
| 5,418,864 | A * | 5/1995 | Murdock et al. | 382/309 |
| 5,805,747 | A * | 9/1998 | Bradford | 382/310 |
| 5,825,506 | A * | 10/1998 | Bednar et al. | 358/402 |
| 5,933,525 | A * | 8/1999 | Makhoul et al. | 382/186 |
| 6,243,504 | B1 | 6/2001 | Kruppa | 382/318 |
| 6,279,453 | B1 * | 8/2001 | Funck | 92/129 |
| 6,351,553 | B1 | 2/2002 | Hayosh | 382/139 |
| 6,654,487 | B1 | 11/2003 | Downs, Jr. | 382/139 |
| 6,863,214 | B2 * | 3/2005 | Garner et al. | 235/379 |
| 7,165,723 | B2 * | 1/2007 | McGlamery et al. | 235/449 |
| 7,233,690 | B2 * | 6/2007 | Lacy | 382/137 |
| 2002/0051562 | A1 | 5/2002 | Sheppard et al. | 382/137 |
| 2003/0161523 | A1 * | 8/2003 | Moon et al. | 382/139 |
| 2003/0219122 | A1 * | 11/2003 | Ramirez et al. | 380/54 |
| 2004/0071333 | A1 * | 4/2004 | Douglas et al. | 382/137 |
| 2004/0217170 | A1 * | 11/2004 | Takiguchi et al. | 235/449 |
| 2004/0245330 | A1 * | 12/2004 | Swift et al. | 235/379 |
| 2005/0097019 | A1 * | 5/2005 | Jacobs | 705/35 |

FOREIGN PATENT DOCUMENTS

| | | |
|---|---|---|
| JP | 63-172365 | 7/1988 |
| JP | 2001022878 | 1/2001 |

* cited by examiner

*Primary Examiner*—Matthew C Bella
*Assistant Examiner*—Anthony Mackowey
(74) *Attorney, Agent, or Firm*—Kunzler & McKenzie

(57) ABSTRACT

An apparatus, system, and method are disclosed for detecting fraud. A first optical character recognition module optically recognizes a character imprinted with a magnetic ink on a medium using a first optical character recognition algorithm. A second optical character recognition module also optically recognizes the character using a second optical character recognition algorithm. In addition, a magnetic ink character recognition module magnetically recognizes the character using a magnetic recognition algorithm. A voting module determines if the character is potentially fraudulent based on the recognition results of the first optical character recognition module, the second optical character recognition module, and the magnetic ink character recognition module. If the character is potentially fraudulent, a results module communicates a fraud indicator.

27 Claims, 7 Drawing Sheets

APPARATUS, SYSTEM, AND METHOD FOR FRAUD DETECTION USING MULTIPLE SCAN TECHNOLOGIES

BACKGROUND OF THE INVENTION

1. Field of the Invention

This invention relates to detecting fraud and more particularly relates to detecting fraud using multiple scan technologies.

2. Description of the Related Art

Retail point of sale ("POS") devices are often configured to read the characters imprinted on a medium such as a paper check using magnetic ink. The characters typically include bank information such as bank routing numbers and the number of the bank account that the check is drawn upon. The POS device may recognize the characters and communicate the recognized bank information to another POS system such as a cash register or to an enterprise computer system.

The POS system may recognize characters using recognition modules. For example, the POS system may use a magnetic ink character recognition ("MICR") module to magnetically recognize a character. The MICR module magnetically may include a magnetic scanner, scanning the magnetic ink of the character and decoding the scan to recognize the character. Many POS devices also employ an optical character recognition ("OCR") module to optically recognize the character. The OCR module may include an optical scanner that optically scans the character. In addition, the OCR module decodes the scan to recognize the character.

The decoded character data comprises recognition results. The recognition results of the MICR module and the OCR module typically comprise a plurality of character candidates, each including a confidence level. For example, recognition results may comprise the character candidate '2' with a confidence level of ninety-five percent (95%), the character candidate '3' with a confidence level of sixty-five percent (65%), and the character candidate '8' with a confidence level of forty-three percent (43%). The POS device selects the '2' character candidate from the recognition results based on the confidence level.

The recognition results of the OCR module may be used to clarify the recognition results of the MICR module. In one embodiment, if a MICR recognition result for a character is indeterminate, the OCR module's recognition result may be used to clarify the MICR recognition results. For example, if the MICR module recognition results were a '8' character candidate with an eight-four percent (84%) confidence level and a '9' character candidate with a confidence level of eight-two percent (82%), the recognition results may be considered indeterminate. The OCR module's recognition result of the character candidate '9' with a ninety-three percent (93%) confidence level and the character candidate '8' with a forty-eight percent (48%) confidence level may be used to resolve the indeterminate recognition result from MICR module and the select the '9' character candidate.

The MICR module and the OCR module may also have conflicting recognition results. Conflicting recognition results may be caused by fraud. Characters may be fraudulently imprinted on a check in order to mimic a valid financial instrument. For example, characters mimicking bank information may be printed on a blank check. A forger may create a printed check that includes one or more characters in the bank information that cannot be recognized by the MICR module, the OCR module, or both modules.

Unfortunately, the POS device cannot always detect fraud or resolve recognition conflicts with only the recognition results of the MICR module and the OCR module. For example, fraudulent bank information on a check may include anomalies that cause the recognition results of the MICR module and the OCR module to disagree. The POS device may be unable to resolve conflicting recognition results or detect fraud from the recognition result conflict using only the MICR and OCR modules because the POS device is limited to two sets of recognition results.

From the foregoing discussion, it should be apparent that a need exists for an apparatus, system, and method that detects fraud using at least three recognition modules. Beneficially, such an apparatus, system, and method would increase the ability of a POS device to detect fraudulent information.

SUMMARY OF THE INVENTION

The present invention has been developed in response to the present state of the art, and in particular, in response to the problems and needs in the art that have not yet been fully solved by currently available fraud detection methods. Accordingly, the present invention has been developed to provide an apparatus, system, and method for fraud detection that overcome many or all of the above-discussed shortcomings in the art.

The apparatus to detect fraud is provided with a logic unit containing a plurality of modules configured to functionally execute the necessary steps of detecting fraudulent printed characters at a retail POS device. These modules in the described embodiments include a MICR module, a first OCR module, a second OCR module, a voting module, and a results module.

The MICR module magnetically recognizes a character imprinted on a medium using magnetic ink. The medium may be a check and bank information may comprise the character. The MICR module generates recognition results from recognizing the character. In one embodiment, the recognition results comprise a plurality of character candidates each with a confidence level. The first OCR module optically recognizes the character using a first OCR algorithm and also generates recognition results. In addition, the second OCR module optically recognizes the character using a second OCR algorithm, generating recognition results.

The voting module determines if the character is potentially fraudulent based on the recognition results of the MICR module, the first OCR module, and the second OCR module. In one embodiment, the voting module uses a look-up table to determine if the character is potentially fraudulent. The results module communicates a fraud indicator if the character is potentially fraudulent. In one embodiment, the results module communicates the fraud indicator to the display of a POS device.

A system of the present invention is also presented to detect fraud. The system may be embodied in a POS receipt printer/scanner. In particular, the system, in one embodiment, includes a memory module, a processor module, and a detection module comprising a MICR module, a first OCR module, a second OCR module, a voting module, and a results module. In one embodiment, the detection module also includes a transport module.

The MICR module may include a magnetic scanner. In addition, the MICR module magnetically recognizes a character imprinted on a check with magnetic ink using a magnetic recognition algorithm. The first OCR module may also include an optical scanner. In one embodiment, the optical scanner optically scans the check and records the scan. The first OCR module optically recognizes the character from the scan using a first OCR algorithm. In addition, the second OCR module optically recognizes the character from the scan using a second OCR algorithm.

The voting module determines if the character is potentially fraudulent based on the recognition results of the MICR module, the first OCR module, and the second OCR module. In a certain embodiment, the voting module stores the potentially fraudulent character determination to the memory module. The results module communicates a fraud indicator if the character is potentially fraudulent. In one embodiment, the results module communicates the fraud indicator such as a warning message to the display of a display In one embodiment, the transport module transports the check relative to the magnetic scanner and the optical scanner, enabling the magnetic and optical scans. In addition, the voting module may direct the transport module to re-transport the check relative to the magnetic scanner and the optical scanner so that the check may be re-scanned in response to the recognition results of the MICR module, the first OCR module, and the second OCR module.

A method of the present invention is also presented for detecting fraud. The method in the disclosed embodiments substantially includes the steps necessary to carry out the functions presented above with respect to the operation of the described apparatus and system. In one embodiment, the method includes optically recognizing a character using a first OCR algorithm, optically recognizing the character using a second OCR algorithm, magnetically recognizing the character, determining if the character is potentially fraudulent, and communicating a fraud indicator.

A first OCR module optically recognizes a character using a first OCR algorithm and a second OCR module optically recognizes the character using a second OCR algorithm. In addition, a MICR module magnetically recognizes the character using a magnetic recognition algorithm. A voting module determines if the character is potentially fraudulent. In one embodiment, the voting module uses a decision tree to determine if the character is potentially fraudulent. If the character is potentially fraudulent, a results module may communicate a fraud indicator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention detects a potentially fraudulent character from the recognition results of a MICR module, a first OCR module employing a first OCR algorithm, and a second OCR employing a second OCR algorithm. In addition, the present invention communicates a fraud indicator if the character is potentially fraudulent.

As is well known by those skilled in the art, MICR technology is based upon the magnetic characteristics of a character. The OCR technology is based upon the optical characteristics of a character. If the two technologies present different decoding results this may be a result of poor magnetic or optical characteristics or may be an indicator of a fraudulent check. When the two OCR recognition engines, which are usually in agreement, present different results from that of the MICR engine or if the two OCR results differ this can be used as an indicator of a potentially fraudulent check and for an operator to more critically view the customer's identification.

It is understood that there is no total solution for capturing or identifying all fraudulent checks. However, as technology continues to view the characteristics of the MICR encoded characters in more detail (such as described via this invention) the level of detection will be enhanced which will result in lower amount of fraudulent checks that are processed. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
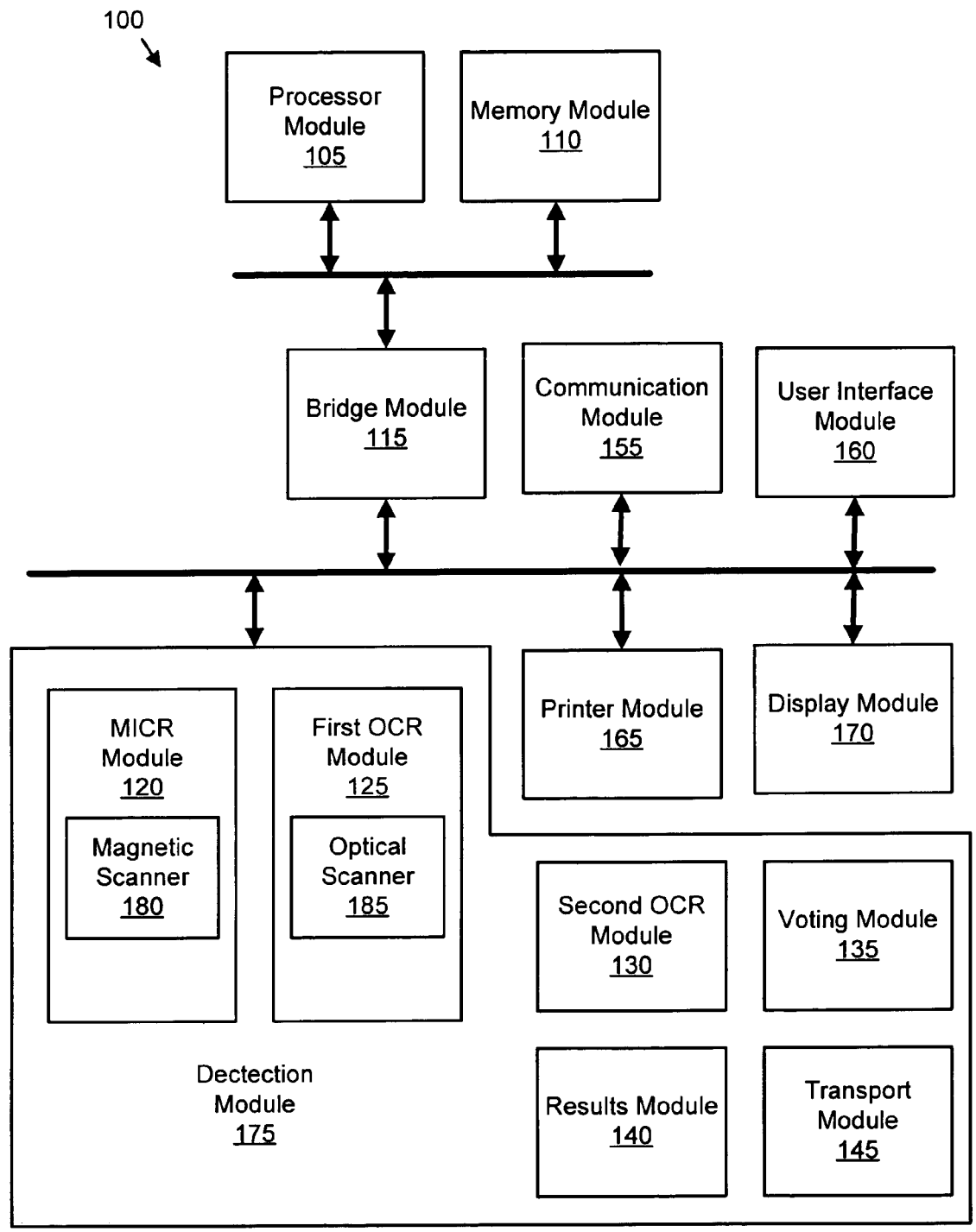
FIG. 1 is a schematic block diagram illustrating one embodiment of a POS system in accordance with the present invention.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a POS system 100 of the present invention. The system 100 includes a processor module 105, a memory module 110, a bridge module 115, a communication module 155, a user interface module 160, a printer module 165, a display module 170, and a detection module 175 comprising a MICR module 120, a first OCR module 125, a second OCR module 130, a voting module 135, a results module 140, and a transport module 145.

The memory module 110 stores digital instructions and data. In one embodiment, the memory module 110 comprises a volatile memory such as a random access memory ("RAM"). Alternatively, the memory module may comprise a non-volatile memory such as a flash RAM. The memory module 110 may also include a programmable read only memory ("PROM") containing software instructions. The processor module 105 executes the software instructions and manipulates the data as is well known to those of ordinary skill in the art.

The processor module 105 and the memory module 110 communicate through the bridge module 115 with the detection module 175, the communication module 155, the user interface module 160, the printer module 165, and the display module 170. The communication module 155 communicates with one or more external devices. In one embodiment, the communication module 155 communicates with another POS system such as a cash register. In an alternate embodiment, the communication module 155 communicates over a network to an enterprise computer system.

The user interface module 160 receives user data input and commands. In one embodiment, the user interface module 160 includes one or more input keys. In an alternate embodiment, the user interface module 160 is configured as a touch screen. In one embodiment, the printer module 165 prints a customer receipt. In addition, the printer module 165 may print upon a medium such as a check. The display module 170 conveys information to the user. In one embodiment, the display module 170 is configured as one or more light emitting diodes ("LED") each conveying a specified message. In an alternate embodiment, the display module 170 displays a plurality of pixels in for example a liquid crystal display ("LCD").

The system 100 processes the medium. In one embodiment, the medium is a check and includes one or more characters imprinted with a magnetic ink. Each character is magnetically and optically recognizable. The characters may comprise bank information such as a bank routing number and a bank account number. The system 100 recognizes the characters using the MICR module 120, the first OCR module 125, and the second OCR module 130 recognition modules 120, 125, 130 with each recognition module 120, 125, 130 contributing recognition results. The system 100 may employ the recognition results from the at least three recognition modules 120, 125, 130 to process the medium as part of a transaction. In addition, the system 100 may employ the recognition results to detect fraud.

The first OCR module 125 may include an optical scanner 185. The optical scanner 185 optically scans a character. In addition, the first OCR module 125 may comprise one or more software programs executing on the processor module 105. The first OCR module 125 recognizes the character by scanning the character and decoding the character using a first OCR algorithm. In one embodiment, the first OCR module 125 generates recognition results. The recognition results may comprise a plurality of character candidates. For example, the first OCR module 125 may decode a scan of a character and generate the recognition result of three character candidates such as '2,' '3,' and '8.' In addition, the recognition result may include a confidence level such as eighty percent (80%) for each character candidate. The confidence level may be a probability that the character candidate corresponds to the character.

The second OCR module 130 recognizes the character using a second OCR algorithm from the scan of the optical scanner 185. In addition, the second OCR module 130 also generates recognition results. The second OCR module 130 may also comprise one or more software programs executing on the processor module 105.

The MICR module 120 may include a magnetic scanner 180. In addition, the MICR module 120 may comprise one or more software programs that execute on the processor module 105. The magnetic scanner 180 magnetically scans the character. The MICR module 120 recognizes the character by employing a magnetic recognition algorithm to decode magnetic scan. In addition, the MICR module 120 generates recognition results from the application of the magnetic recognition algorithm. Although the system 100 is depicted with one MICR module 120 and two OCR modules 125, 130, any number of MICR modules 120 and two or more OCR modules 125, 130 may be employed.

The voting module 135 determines if the character is potentially fraudulent based on the recognition results of the MICR module 120, the first OCR module 125, and the second OCR module 130. In one embodiment, the voting module 135 is configured as a software program executing on the processor module 105. The results module 140 communicates a fraud indicator if the voting module 135 determines the character is potentially fraudulent. For example, the results module 140 may communicate a warning message to the display module 170. The system 100 detects potential fraud using at least three recognition modules 120, 125, 130.

In one embodiment, the transport module 145 transports the medium relative to the magnetic scanner 180 and the optical scanner 185, enabling the magnetic and optical scans of the character. In a certain embodiment, the transport module 145 comprises one or more motorized rollers. The transport module 145 may re-transport the medium relative to the magnetic scanner 180 and the optical scanner 185 based on the recognition results of the MICR module 120, the first OCR module 125, and the second OCR module 130. For example, if the recognition results of the first OCR module 125 and the second OCR module 130 generate conflicting recognition results for a character, the transport module 145 may re-transport the medium and the optical detection module 185 may re-scan the medium. In addition, the first OCR module 125 and the second OCR module 130 may again decode the character and generate recognition results.

Figure 2:
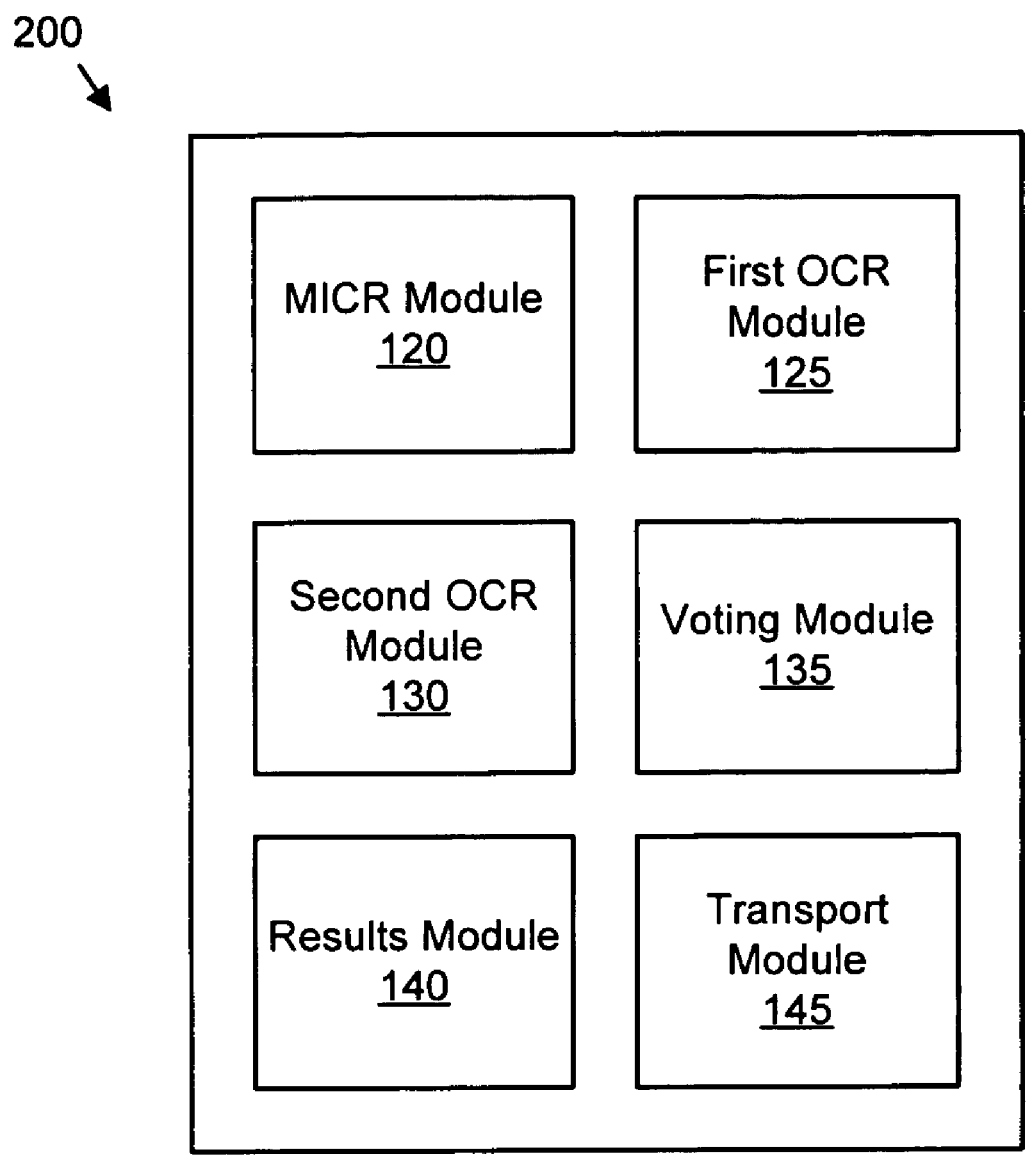
FIG. 2 is a schematic block diagram illustrating one embodiment of a fraud detection apparatus of the present invention.

FIG. 2 is a schematic block diagram illustrating one embodiment of a fraud detection apparatus 200 of the present invention. The first OCR module 125 optically recognizes a character using a first OCR algorithm. The character is printed with a magnetic ink and may be recognized optically and magnetically. For example, the character may comprise a magnetic character from a font such as E-13B or CMC-7. Alternatively, the character may comprise an OCR font such as OCR-A and OCR-B.

In one embodiment, the first OCR module 125 comprises an optical scanner 185 and scans the character. In an alternate embodiment, the first OCR module 125 receives the scan of the character. The first OCR module 125 further decodes the scan using a first OCR algorithm and generates recognition results. In addition, the second OCR module 130 also optically recognizes the character using a second OCR algorithm, generating additional recognition results. In one embodiment, the second OCR module 130 decodes the scan produced by the optical scanner of the first OCR module 125.

The MICR module 120 magnetically recognizes the character using a magnetic recognition algorithm and generates recognition results. In addition, the MICR module 120 may detect the magnetic signal strength of the magnetic ink of the character. The MICR module 120 may detect no magnetic signal, a low-strength magnetic signal, or an expected strength magnetic signal. The low-strength magnetic signal as used herein refers to a magnetic signal strength fifty percent (50%) less than a specified magnetic signal strength for characters imprinted with magnetic ink. The specified magnetic signal strength may apply to financial instruments such as checks and may vary from country to country. The expected strength magnetic signal as used herein refers to a magnetic signal strength greater than fifty percent (50%) of the specified magnetic signal strength.

The voting module 135 determines if the character is potentially fraudulent based on the recognition results of the MICR module 120, the first OCR module 125, and the second OCR module 130. In addition, the voting module 135 may base the determination in part on the magnetic signal strength of the character. For example, the voting module 135 may determine that a character is potentially fraudulent if the character has no detectable magnetic signal.

In one embodiment, the voting module 135 uses a look-up table to determine if the character is potentially fraudulent. In a certain embodiment, the voting module 135 may define a plurality of relationships based on the recognition results. The relationships may include but are not limited to: the MICR module's 120 character candidate with the highest confidence level being equivalent to the first OCR module's 125 character candidate with the highest confidence level; the first OCR module's 125 character candidate with the highest confidence level being equivalent to the second OCR module's 130 character candidate with the highest confidence level; and the MICR module's 120 character candidate with the highest confidence level being equivalent to the second OCR module's 130 character candidate with the highest confidence level.

The voting module 135 may use the plurality of relationships as conditions that address the look-up table and select a result. For example, if the character candidate with the highest confidence level of the MICR module 120, the first OCR module 125, and the second OCR module 130 are the same, and if the MICR module 120 detected the expected magnetic signal strength at the character, the voting module 135 may determine that the character is not potentially fraudulent. Alternatively, if the character candidate with the highest confidence level of the MICR module 120 differs from the character candidate with the highest confidence level of the first OCR module 125 and the second OCR module 130, the voting module 135 may determine that the character is potentially fraudulent.

The results module 140 communicates a fraud indicator if the voting module 135 determines the character is potentially fraudulent. In one embodiment, the results module 140 communicates the fraud indicator to the display module 170 of a POS system 100 such as a printer, cash register, and the like. For example, the results module 140 may illuminate an LED to indicate that a check is potentially fraudulent and to prompt an operator to refuse to accept the check, ask for additional identification, or the like.

Using the recognition results of at least three recognition modules such as the MICR module 120, the first OCR module 125, and the second OCR module 130 allows the apparatus 200 to determine if a character is potentially fraudulent with increased accuracy by expanding the available information when two recognition modules disagree. For example, if the recognition results of the MICR module 120 and the first OCR module 125 are not equivalent, the voting module 135 may use the recognition results of the second OCR module 130 to improve the recognition of the character and determine if the character is potentially fraudulent.

Figure 3:
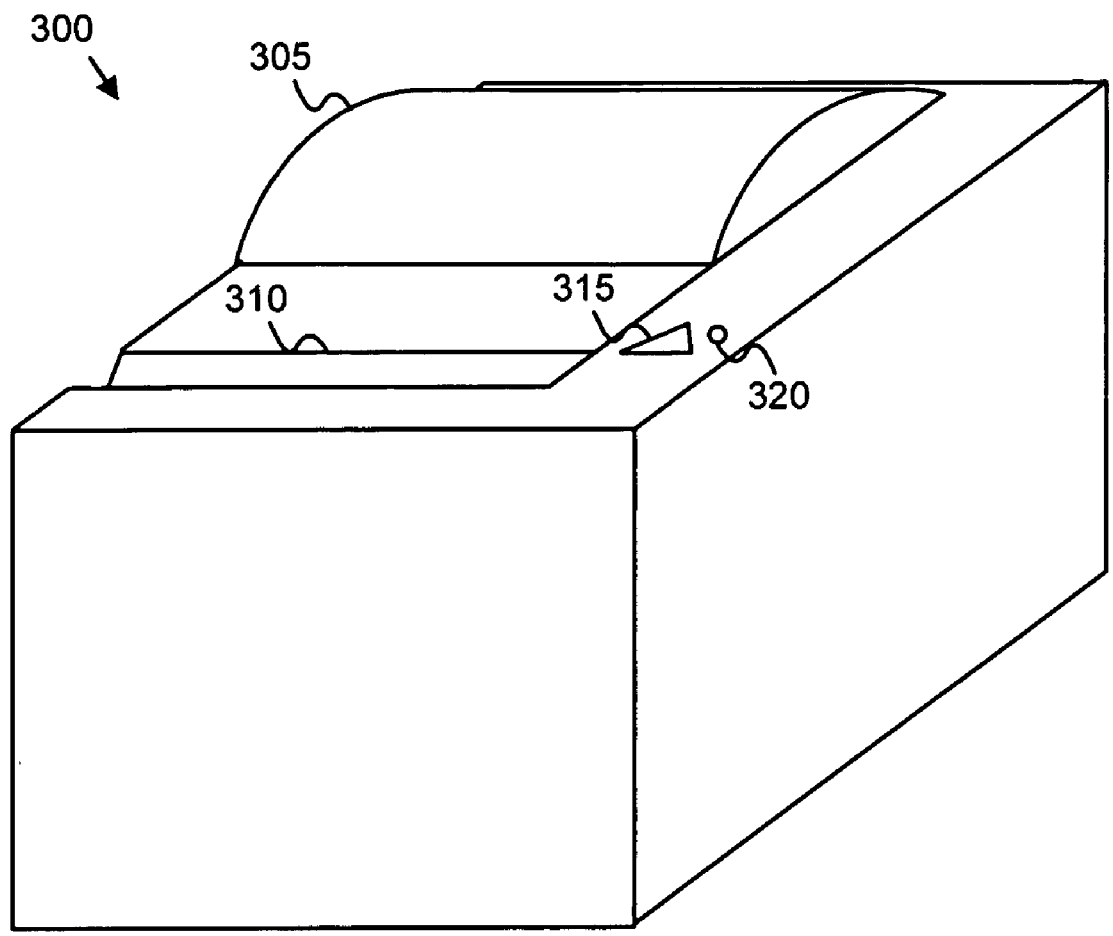
FIG. 3 is a perspective drawing illustrating one embodiment of a POS system of the present invention.

FIG. 3 is a perspective drawing illustrating one embodiment of a POS system 300 of the present invention. The system 300 includes a paper drum 305, an exit slot 310, a user input 315, and an LED 320. In one embodiment, the system 300 is a TI 8 printer manufactured by International Business Machines Corporation of Armonk, N.Y.

The paper drum 305 contains a replaceable roll of paper or other printable medium. The system 300 imprints characters on the paper using thermal printing technology, impact printing technology, or the like. The printed paper emerges from the exit slot 310.

The user input 315 comprises a push button and is configured to receive user input. In one embodiment, the user input 315 is configured as the user interface module 160 of FIG. 1. The LED 320 may indicate one or more status states of the system 300. In one embodiment, the LED 320 is the display module 170 of FIG. 1. In a certain embodiment, the LED 320 displays a fraud indicator.

The following schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
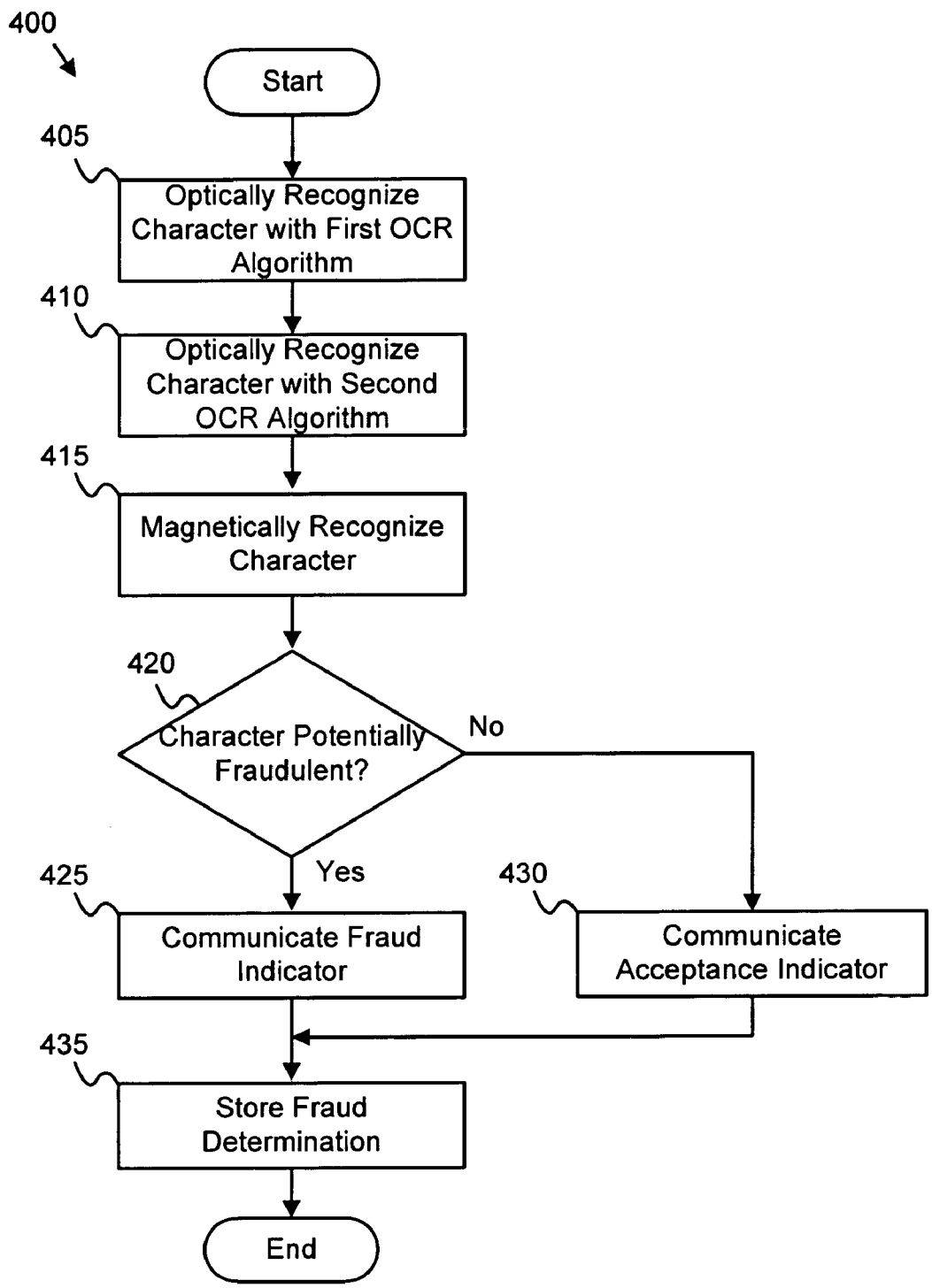
FIG. 4 is a schematic flow chart diagram illustrating one embodiment of a fraud detection method in accordance with the present invention.

FIG. 4 is a schematic flow chart diagram illustrating one embodiment of a fraud detection method 400 of the present invention. A first OCR module 125 optically recognizes 405 a character imprinted on a medium such as a check using a first OCR algorithm. In one embodiment, the first OCR algorithm is a line segmentation OCR algorithm as is well known to those skilled in the art. In an alternate embodiment, the first OCR algorithm is a hidden Markov model OCR algorithm. Recognizing 405 the character generates recognition results.

A second OCR module 130 optically recognizes 410 the character using a second OCR algorithm and generating recognition results. In one embodiment, the second OCR algorithm is a statistical pattern recognition OCR algorithm. The second OCR algorithm may also be a line segmentation or a hidden Markov model OCR algorithm, but must differ from the first OCR algorithm.

A MICR module 120 magnetically recognizes 415 the character using a magnetic recognition algorithm and generates recognition results. The character is imprinted using a magnetic ink. In one embodiment, the character is organized on a seven by eleven (7×11) square grid. In an alternate embodiment, the character is organized as seven vertical bars separated by spaces of varying size.

A voting module 135 determines 420 if the character is potentially fraudulent. In one embodiment, the voting module 135 uses a decision tree to determine 420 if the character is potentially fraudulent. In addition, the voting module 135 may employ information on the strength of the magnetic signal from the MICR module 120 to determine 420 if the character is potentially fraudulent. Although in the depicted embodiment, the voting module 135 determines if one character is potentially fraudulent, the voting module 135 may determine if a plurality of characters are potentially fraudulent.

If the voting module 135 determines 420 the character is potentially fraudulent, a results module 140 may communicate 425 a fraud indicator. For example, the results module 140 may communicate 425 a fraud indicator instruction via a LCD display module 170 directing an operator to ask for photographic identification or to get approval from a manager. In one embodiment, the results module 140 stores 435 the potentially fraudulent character determination. For example, the results module 140 may append the potentially fraudulent character determination to a transaction that is stored.

In one embodiment, if the voting module 135 determines 420 the character is not potentially fraudulent, the results module 140 communicates 430 an acceptance indicator. In one embodiment, the acceptance indicator communicates 430 that no additional approval or documentation is required to accept a check. For example, the results module 140 may illuminate an acceptance LED display module 170 indicating that the check is accepted. Alternatively, the results module 140 may communicate 430 an acceptance message via a LCD display module 170 to the operator. The method 400 detects potentially fraudulent characters using the recognition results from at least three distinct algorithms.

Figure 5:
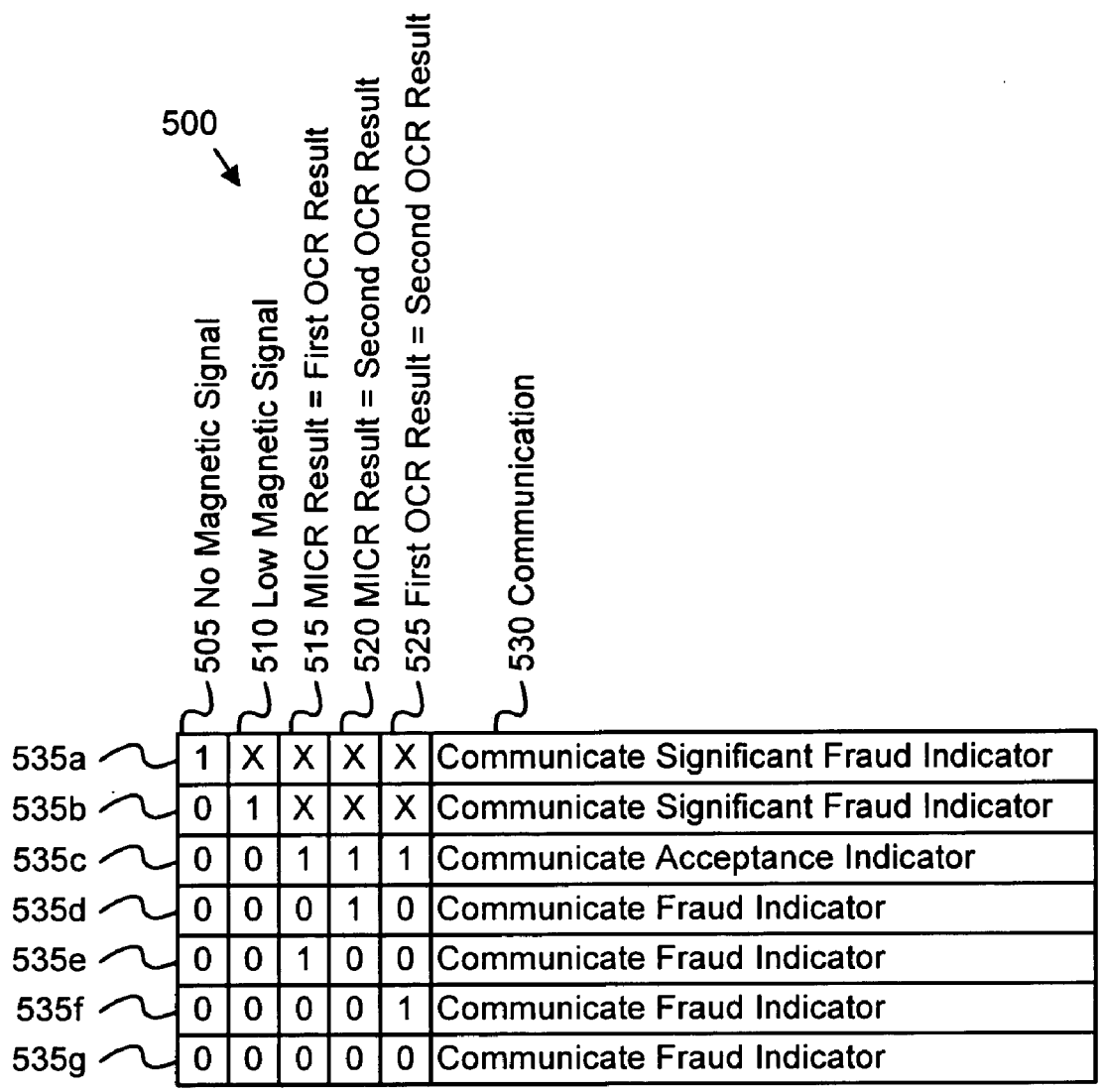
FIG. 5 is a schematic block diagram illustrating one embodiment of a look-up table of the present invention.

FIG. 5 is a schematic block diagram illustrating one embodiment of a look-up table 500 of the present invention. The look-up table comprises a plurality of conditions including a no magnetic signal condition 505, a low strength magnetic signal condition 510, a MICR result equals first OCR result condition 515, a MICR result equals second OCR result condition 520, and a first OCR result equals second OCR result condition 525. The table 500 further comprises a plurality of table entries 535, each with a unique set of condition values 505, 510, 515, 520, 525 and a communication value 530.

A voting module 135 may determine if a character is potentially fraudulent by comparing a set of observed conditions values to the condition values 505, 510, 515, 520, 525 of the look-up table 500 and selecting a table entry 535 with corresponding conditions. For example, if the MICR result equals second OCR result condition 520 is asserted or equal to one (1) and all other conditions 505, 510, 515, 525 are not asserted or equal to zero (0), the voting module 135 may select the corresponding table entry 535d. In addition, results module 140 may communicate the communication value 530 of corresponding table entry 535d as the fraud indicator. The look-up table 500 may be used to determine 420 if a character is potentially fraudulent and provide an appropriate fraud indicator or acceptance indicator.

Figure 6:
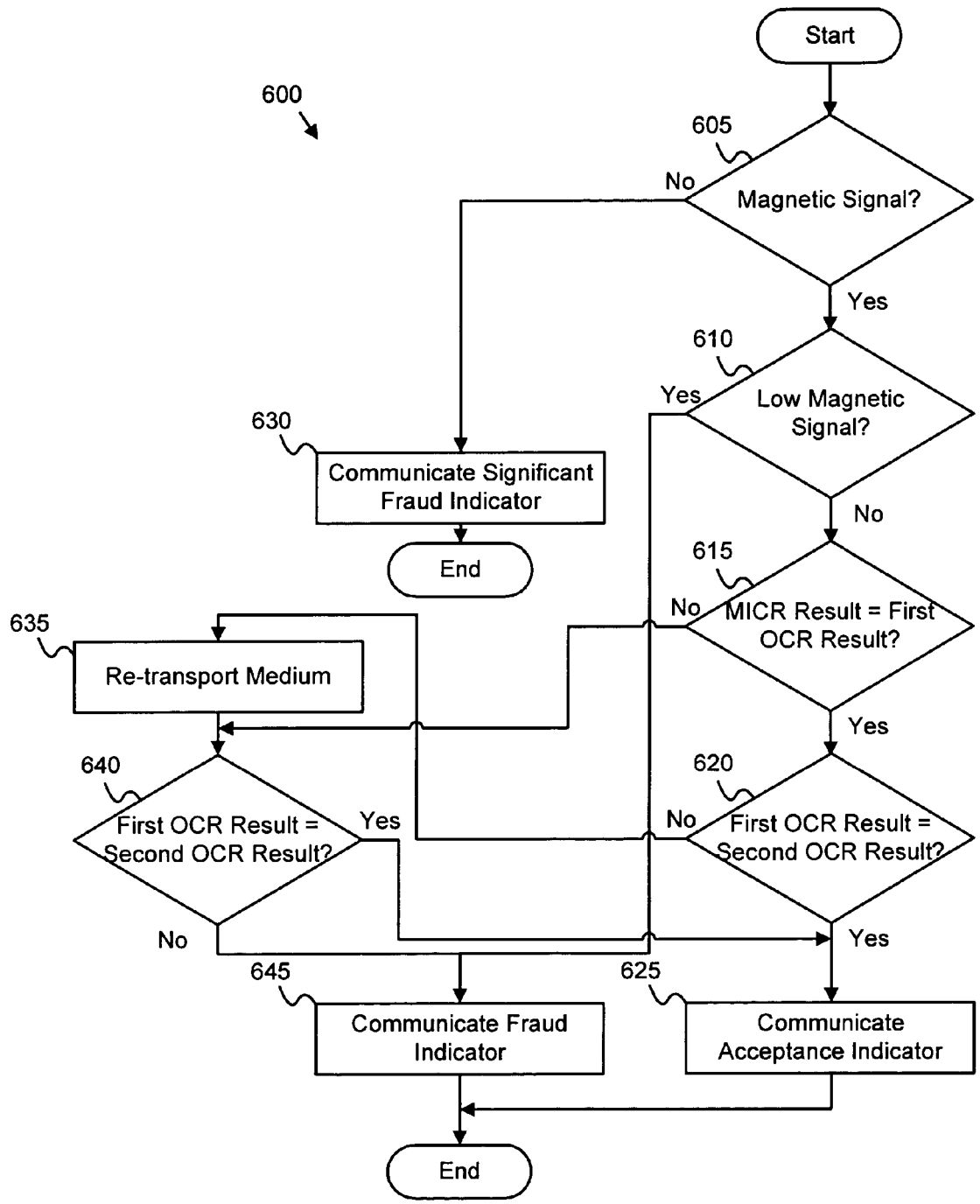
FIG. 6 is a schematic flow chart diagram illustrating one embodiment of a decision tree method of the present invention.

FIG. 6 is a schematic flow chart diagram illustrating one embodiment of a decision tree method 600 of the present invention. A voting module 135 determines 605 if a character has a magnetic signal. If the character has no magnetic signal, the results module 140 may communicate 630 a significant fraud indicator and the decision tree method 600 terminates. The significant fraud indicator may indicate that the character is likely to be fraudulent and direct, for example, that an operator should not accept a medium such as a check imprinted with the character.

If the character has a magnetic signal, the voting module 135 may further determine 610 if the character has a low magnetic signal strength. In one embodiment, the voting module 135 determines 610 has a low magnetic signal strength by comparing the character's signal strength to a specified value. If the character has a low strength magnetic signal, the results module 140 communicates 645 a fraud indicator and the method 600 terminates.

If the character does not have a low strength magnetic signal, the voting module 135 determines 615 if the MICR module 120 recognition results are equivalent to the first OCR module 125 recognition results. For example, the voting module 135 may compare the highest confidence level character candidate of the MICR module 120 to the highest confidence level character candidate of the first OCR module 125 and determine 615 the recognition results are equivalent if both the highest confidence level character candidates are equivalent.

If the MICR module 120 recognition results are not equivalent to the first OCR module 125 recognition results, the voting module 135 determines 640 if the first OCR module 125 recognition results are equivalent to the second OCR module 130 recognition results. If the first OCR module 125 recognition results are equivalent to the second OCR module 130 recognition results, the results module 140 communicates 625 an acceptance indicator and the method 600 terminates. If the first OCR module 125 recognition results are not equivalent to the second OCR module 130 recognition results, the results module 140 communicates 645 a fraud indicator and the method 600 terminates.

If the MICR module 120 recognition results are equivalent to the first OCR module 125 recognition results, the voting module 135 determines 620 if the first OCR module 125 recognition results are equivalent to the second OCR module 130 recognition results. If the first OCR module 125 recognition results are not equivalent to the second OCR module 130 recognition results, the transport module 145 re-transports 635 the medium of the character allowing a optical scanner 185 to re-scan the character. In addition, the voting module 135 again determines 640 if the first OCR module 125 recognition results are equivalent to the second OCR module 130 recognition results. If the first OCR module 125 recognition results are equivalent to the second OCR module 130 recognition results, the results module 140 communicates 625 an acceptance indicator and the decision tree method 600 terminates. If the first OCR module 125 recognition results are not equivalent to the second OCR module 130 recognition results, the results module 140 communicates 645 a fraud indicator and the method 600 terminates.

If the voting module 135 determines 620 that the first OCR module 125 recognition results are equivalent to the second OCR module 130 recognition results, the results module 140 communicates 625 an acceptance indicator and the decision tree method 600 terminates. The method 600 detects a potentially fraudulent character using conditions derived from three or more recognition modules 120, 125, 130.

Figure 7:
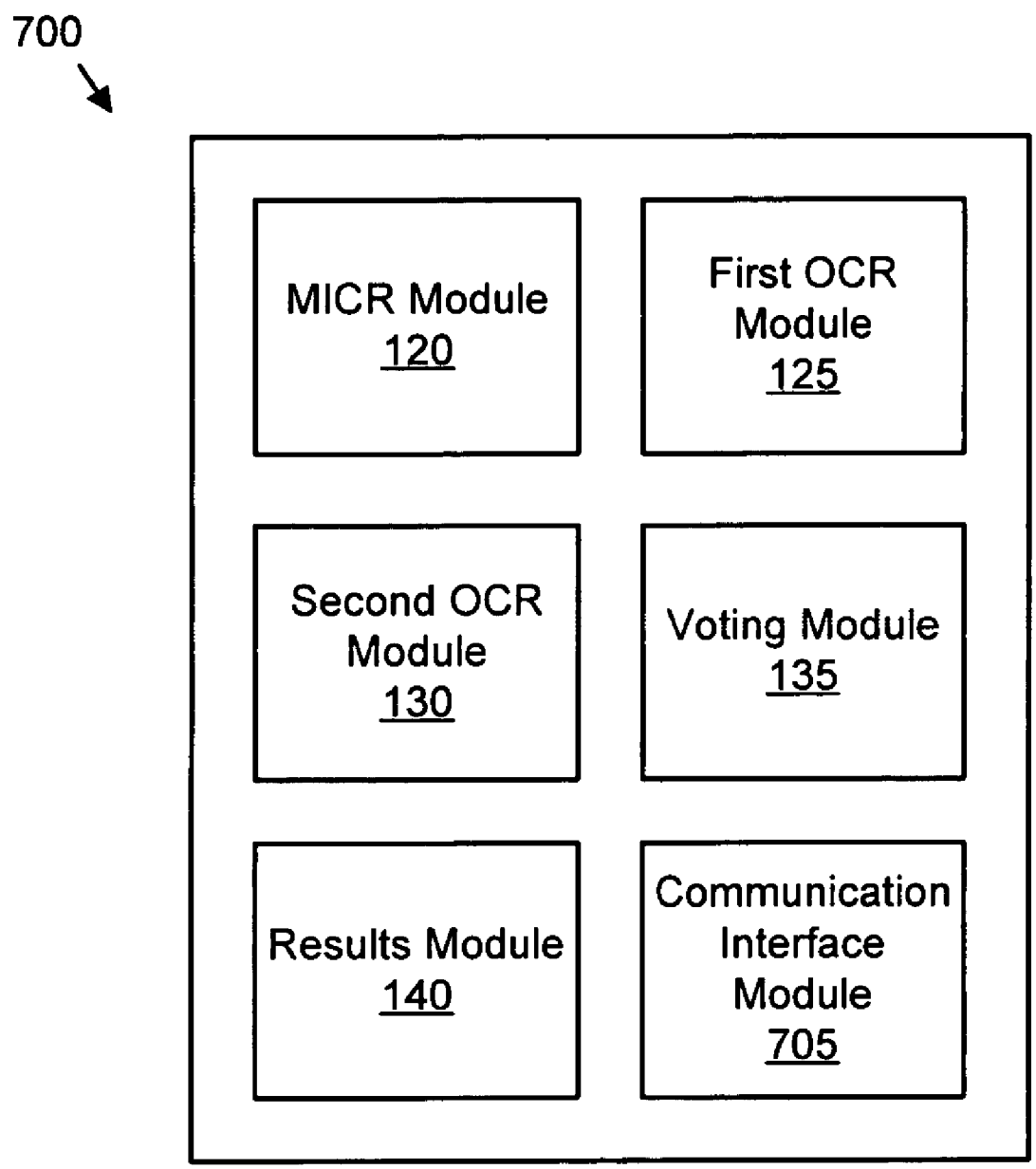
FIG. 7 is a schematic block diagram illustrating one embodiment of a fraud detection host of the present invention.

FIG. 7 is a schematic block diagram illustrating one embodiment of a fraud detection host 700 of the present invention. The host 700 may be an enterprise computer system in communication with a POS system 100. In the depicted embodiment, the host 700 includes a MICR module 120, a first OCR module 125, a second OCR module 130, a voting module 135, a results module 140, and a communications interface module 705.

The communications interface module 705 receives a magnetic scan of a character from a magnetic scanner 180 and an optical scan of the character from an optical scanner 185. In one embodiment, the POS system 100 comprises the magnetic scanner 180 and the optical scanner 185. The MICR module 120 recognizes the character using a magnetic recognition algorithm. The first OCR module 125 also recognizes the character using a first OCR algorithm and the second OCR module 130 recognizes the character using a second OCR algorithm. The voting module 135 determines if the character is potentially fraudulent based on the recognition results of the MICR module 120, the first OCR module 125, and the second OCR module 130. In addition, the results module 140 communicates a fraud indicator if the character is potentially fraudulent. In one embodiment, the results module 140 communicates the fraud indicator through the communications interface module 705 to the POS system 100.

The present invention detects a potentially fraudulent character from the recognition results of a MICR module 120 employing a magnetic character recognition algorithm, a first OCR module 135 employing a first OCR algorithm, and a second OCR 130 employing a second OCR algorithm. In addition, the present invention communicates a fraud indicator if the character is potentially fraudulent. Thus, the present invention detects potential fraud using the recognition results of at least three recognition modules. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to detect fraud, the apparatus comprising:
an MICR module that scans a single row of Magnetic Ink Character Recognition ("MICR") characters imprinted on a medium using magnetic ink, recognizes individual MICR characters within the single row of MICR characters, and detects a magnetic signal strength of the magnetic ink of the MICR characters;
a first OCR module that scans the single row of MICR characters and recognizes individual MICR characters within the single row of MICR characters, the first OCR module recognizes the individual MICR characters using a first Optical Character Recognition ("OCR") algorithm;
a second OCR module that scans the single row of MICR characters and recognizes individual MICR characters within the single row of MICR characters, the second OCR module recognizes the individual MICR characters using a second OCR algorithm, wherein the second OCR algorithm differs from the first OCR algorithm;
a voting module that determines if a MICR character is potentially fraudulent based on the recognition results of the MICR module, the first OCR module, and the second OCR module, wherein determining that a MICR character is potentially fraudulent comprises one or more of the MICR module determining that the magnetic signal strength of the MICR character is lower than a predetermined value and the character recognized by the MICR module, the character recognized by the first OCR module, and the character recognized by the second OCR module are not identical; and
a results module configured to communicate a fraud indicator if the voting module determines that a MICR character is potentially fraudulent,
wherein the MICR module, the first OCR module, the second OCR module, the voting module, and the results module comprise one or more of logic hardware and a processor executing executable code, the executable code stored on one or more computer readable media.

2. The apparatus of claim 1, wherein the medium is configured as a check.

3. The apparatus of claim 1, wherein the MICR module comprises a magnetic scanner and the first OCR module comprises an optical scanner and further comprising a transport module configured to transport the medium relative to the magnetic scanner and the optical scanner.

4. The apparatus of claim 3, wherein the voting module is configured to direct the transport module to re-transport the medium based on the recognition results of the MICR module, the first OCR module, and the second OCR module.

5. The apparatus of claim 1, wherein the recognition results of the MICR module, the first OCR module, and the second OCR module each comprise a plurality of character candidates each with a confidence level.

6. The apparatus of claim 1, wherein the voting module is further configured to determine if the character is potentially fraudulent using a look-up table.

7. The apparatus of claim 1, wherein the voting module is further configured to determine if the character is potentially fraudulent using a decision tree.

8. An apparatus to detect fraud, the apparatus comprising:
a communication interface module configured to receive one or more optical scans and a magnetic scan of a row of characters imprinted on a check using magnetic ink;
an MICR module that scans a single row of MICR characters imprinted on a medium using magnetic ink, recognizes individual MICR characters within the single row of MICR characters, and detects a magnetic signal strength of the magnetic ink of the MICR characters;
a first OCR module that scans the single row of MICR characters and recognizes individual MICR characters within the single row of MICR characters, the first OCR module recognizes the individual MICR characters using a first OCR algorithm;
a second OCR module that scans the single row of MICR characters and recognizes individual MICR characters within the single row of MICR characters, the second OCR module recognizes the individual MICR characters using a second OCR algorithm, wherein the second OCR algorithm differs from the first OCR algorithm;
a voting module that determines if a MICR character is potentially fraudulent based on the recognition results of the MICR module, the first OCR module, and the second OCR module, wherein determining that a MICR character is potentially fraudulent comprises one or more of the MICR module determining that the magnetic signal strength of the MICR character is lower than a predetermined value and the character recognized by the MICR module, the character recognized by the first OCR module, and the character recognized by the second OCR module are not identical; and
a results module configured to communicate a fraud indicator if the voting module determines that a MICR character is potentially fraudulent,
wherein the MICR module, the first OCR module, the second OCR module, the voting module, and the results module comprise one or more of logic hardware and a processor executing executable code, the executable code stored on one or more computer readable media.

9. A system to detect fraud, the system comprising:
a memory module;
a processor module; and
a detection module comprising:
an MICR module that scans a single row of MICR characters imprinted on a check using magnetic ink, recognizes individual MICR characters within the single row of MICR characters, and detects a magnetic signal strength of the magnetic ink of the MICR characters;
a first OCR module that scans the single row of MICR characters and recognizes individual MICR characters within the single row of MICR characters, the first OCR module recognizes the individual MICR characters using a first OCR algorithm;
a second OCR module that scans the single row of MICR characters and recognizes individual MICR characters within the single row of MICR characters, the second OCR module recognizes the individual MICR characters using a second OCR algorithm, wherein the second OCR algorithm differs from the first OCR algorithm;
a voting module that determines if a MICR character is potentially fraudulent based on the recognition results of the MICR module, the first OCR module, and the second OCR module, wherein determining that a MICR character is potentially fraudulent comprises one or more of the MICR module determining that the magnetic signal strength of the MICR character is lower than a predetermined value and the character recognized by the MICR module, the character recognized by the first OCR module, and the character recognized by the second OCR module are not identical; and
a results module configured to communicate a fraud indicator if the voting module determines that a MICR character is potentially fraudulent.

10. The system of claim 9, wherein the MICR module further comprises a magnetic scanner, the first OCR module comprises an optical scanner, and the detection module comprises a transport module configured to transport the medium relative to the magnetic scanner and the optical scanner.

11. The system of claim 10, wherein the voting module is configured to direct the transport module to re-transport the check based on the recognition results of the MICR module, the first OCR module, and the second OCR module.

12. The system of claim 9, further comprising a printer module configured to print a point of sale record.

13. The system of claim 9, further comprising a communication module configured to communicate with an enterprise computer system.

14. The system of claim 9, wherein the recognition results of the MICR module, the first OCR module, and the second OCR module each comprise a plurality of character candidates each with a confidence level.

15. The system of claim 9, wherein the voting module is further configured to determine if the character is potentially fraudulent based on a look-up table.

16. The system of claim 9, wherein the voting module is further configured to store the potentially fraudulent character determination to the memory module.

17. A computer readable medium tangibly embodying a program of machine-readable instructions executable by a digital processing apparatus to perform operations to detect fraud, the operations comprising:
magnetically scanning a single row of Magnetic Ink Character Recognition ("MICR") characters imprinted on a medium using magnetic ink;
recognizing individual MICR characters within the single row of MICR characters and detecting a magnetic signal strength of the magnetic ink of the MICR characters, wherein recognizing MICR characters and detecting the magnetic signal strength comprise using a magnetic recognition algorithm;
optically scanning the single row of MICR characters
recognizing individual MICR characters within the single row of MICR characters using a first OCR algorithm;
recognizing individual MICR characters within the single row of MICR characters using a second OCR algorithm, wherein the second OCR algorithm differs from the first OCR algorithm;
determining if a MICR character is potentially fraudulent based on the recognition results of the first OCR algorithm, the second OCR algorithm, and the magnetic recognition algorithm, wherein determining that a MICR character is potentially fraudulent comprises one or more of determining that the magnetic signal strength of the MICR character is lower than a predetermined value and the character recognized by the magnetic recognition algorithm, the character recognized by the first OCR algorithm, and the character recognized by the second OCR algorithm are not identical; and
communicating a fraud indicator in response to determining that a MICR character is potentially fraudulent.

18. The computer readable medium of claim 17, wherein the instructions further comprise operations to transport the medium.

19. The computer readable medium of claim 17, wherein the instructions further comprise operations to re-transport the medium in response to the recognition results of the first OCR algorithm, the second OCR algorithm, and the magnetic recognition algorithm.

20. The computer readable medium of claim 17, wherein the instructions further comprise operations to calculate a confidence level for each of a plurality of character candidates.

21. The computer readable medium of claim 17, wherein the instructions further comprise operations to determine if the character is potentially fraudulent using a look-up table.

22. The computer readable medium of claim 17, wherein the instructions further comprise operations to determine if the character is potentially fraudulent using a decision tree.

23. The computer readable medium of claim 17, wherein the instructions further comprise operations to store the potentially fraudulent character determination.

24. The computer readable medium of claim 17, wherein the first OCR algorithm is a line segmentation OCR algorithm.

25. The computer readable medium of claim 17, wherein the second OCR algorithm is a statistical pattern recognition OCR algorithm.

26. The computer readable medium of claim 17, wherein the first OCR algorithm is a hidden Markov model OCR algorithm.

27. An apparatus to detect fraud, the apparatus comprising:
means for magnetically scanning a single row of Magnetic Ink Character Recognition ("MICR") characters imprinted on a medium using magnetic ink;

means for recognizing individual MICR characters within the single row of MICR characters and detecting a magnetic signal strength of the magnetic ink of the MICR characters, wherein recognizing MICR characters and detecting the magnetic signal strength comprise using a magnetic recognition algorithm;

means for optically scanning the single row of MICR characters means for recognizing individual MICR characters within the single row of MICR characters using a first OCR algorithm;

means for individual MICR characters within the single row of MICR characters using a second OCR algorithm, wherein the second OCR algorithm differs from the first OCR algorithm;

means for determining if a MICR character is potentially fraudulent based on the recognition results of the first OCR algorithm, the second OCR algorithm, and the magnetic recognition algorithm, wherein determining that a MICR character is potentially fraudulent comprises one or more of determining that the magnetic signal strength of the MICR character is lower than a predetermined value and the character recognized by the magnetic recognition algorithm, the character recognized by the first OCR algorithm, and the character recognized by the second OCR algorithm are not identical; and means for communicating a fraud indicator in response to determining that a MICR character is potentially fraudulent.

* * * * *